United States Patent [19]

Berkovitz et al.

[11] 4,074,083

[45] Feb. 14, 1978

[54] STEREOPHONIC SOUND SYSTEM PARTICULARLY USEFUL IN A CINEMA AUDITORIUM

[75] Inventors: Robert Abraham Berkovitz, Lexington, Mass.; Kenneth James Gundry, London, England

[73] Assignee: Dolby Laboratories, Inc., San Francisco, Calif.

[21] Appl. No.: 603,670

[22] Filed: Aug. 11, 1975

[30] Foreign Application Priority Data

Aug. 29, 1974 United Kingdom ............... 37897/74

[51] Int. Cl.[2] .................................................. G11B 7/00

[52] U.S. Cl. ..................... 179/100.1 TD; 179/100.3 T

[58] Field of Search .............. 179/100.1 TD, 100.3 T, 179/100.3 B, 1 G

[56] References Cited

U.S. PATENT DOCUMENTS

| | | | |
|---|---|---|---|
| 2,786,894 | 3/1957 | Gunby | 179/100.1 TD |
| 2,819,348 | 1/1958 | Bogert | 179/100.1 TD |
| 3,176,072 | 3/1965 | Novak | 179/1 G |
| 3,417,203 | 12/1968 | Hafler | 179/1 G |
| 3,646,574 | 2/1972 | Holzer | 179/1 G |

*Primary Examiner*—Harold I. Pitts
*Attorney, Agent, or Firm*—Robert F. O'Connell

[57] ABSTRACT

A network is described which processes two channel stereophonic sound programs for playback through left, right and center sound reproduction channels. Use of the network allows certain advantages of a three channel program to be obtained from the two channel program. The network delays the left and right channels to give precedence to the center channel information but reduces the level of this information to enable the left and right channels to establish a stereo image.

6 Claims, 2 Drawing Figures

STEREOPHONIC SOUND SYSTEM PARTICULARLY USEFUL IN A CINEMA AUDITORIUM

BACKGROUND OF THE INVENTION

When a signal is fed to two loudspeakers equally distant from a listener, and symmetrically placed before him, the resulting sound seems to come from a location midway between the loudspeakers. If the listener moves closer to one of the loudspeakers, the apparent location of the source of sound also moves in the same direction. If the difference in distance is sufficiently large, the sound will appear to come only from the nearer loudspeaker. This effect limits the effectiveness of two channel sterophonic sound reproduction for listeners not approximately equidistant from the two loudspeakers.

A practical result of the effect has been the inability of the cinema industry to use two channel stereophonic sound systems in conjunction with film exhibition. In this application, it is highly desirable that the voices of the actors should appear in the great majority of scenes to come from the center of the screen, which is the location as their images, for members of the audience seated in all parts of the theatre. Because of the effect described above, listeners near the screen and away from the center line of the auditorium will hear the actors' voices as coming from the side, rather than the center of the screen. As a result, cinema exhibition, while universally employing an optical sound track for single-channel sound, has made use of three or more tracks for stereophonic sound reproduction. Multiple-track recordings to provide three or more tracks are normally made by the application of a magnetic recording medium to the film, a process which greatly increases the cost of the prints used for exhibition. Furthermore, since magnetic and optical sound tracks cannot be played on the same apparatus, exhibitors must add equipment to their threatres to play the magnetically recorded tracks, and distributors of films must maintain stocks of both types to service the requirements of different exhibitors. This is particularly unfortunate because two-channel sterophonic sound tracks can be made optically, and the resulting films could be satisfactorily projected as single-channel programs in all theatres, were it not essential to provide a stable central image, only obtainable from a third channel.

It has been proposed to sum the two signals from the channels of a two-channel sound track to provide a center-channel signal which is fed to a center-channel amplifer and loudspeaker. In particular, U.S. Pat. No. 2,819,348, issued to B.P. Bogert on Jan. 7, 1958, describes a system in which a delay is introduced into the center channel so that the left and right loudspeakers are enabled by the known procedence effect to establish a stereo image. It is stated that this enables the left and right loudspeakers to handle little power, not necessarily of good quality, yet still establish the stereo image, while a high quality center channel amplifier and loudspeaker establish the main impression of sound quality and volume.

It can be seen, however, that such an arrangement will establish the stero image incorrectly for listeners appreciably nearer to one of the left and right loudspeakers than the other.

SUMMARY OF THE INVENTION

According to the present invention, there is provided a stereophonic sound reproducing system comprising two inputs for left and right channel signals, left and right amplifying channels and loudspeakers connected to the respective inputs, means for summing the signals from the two inputs, and a center amplifying channel and loudspeaker connected to receive the summed signals, wherein each of the left and right amplifying channels includes sufficient delay to establish a precedence effect for the center channel loudspeaker, and the level of sound provided by the center channel loudspeaker is sufficiently less that that provided by the left and right channel loudspeakers for the latter to establish a stereo image when the left and right channel signals differ. The amount of delay required in the left and right channels will depend upon the size of the theatre but should ensure that, at practically every seat, the listener should receive the center channel sound first. The delay may be 6 to 12 milliseconds, or more for a large auditorium.

The invention enables a two-channel stereophonic program to be used with a three-channel playback system, which retains the stability of centrally-localized sound otherwise requiring a three-channel program. Because this permits the use of two-channel optical sound recordings for stereophonic sound presentations in the cinema, it simplifies and reduces the cost of such presentation. Moreover, as such sound tracks work equally well in cinema theatres equipped only with singlechanneloptical sound playback systems, distributors need not stock more than one kind of print, if they wish to release stereophonic versions of the films they distribute. Clearly, the same principles apply to any location in which three-channel sound reproduction is desirable from the standpoint of the stability of the information presented from the third, central channel, so that the application of the invention to cinema exhibition is to be taken only as a significant, but not exclusive, application of the invention.

Any two-channel sterophonic recording may be reproduced through the network to be described. In the preparation of motion picture sound tracks, it is common for a three-channel master recording to be prepared. For optimum use of the invention, the three-channel recording would first be transferred to two channels by adding the center channel, at (for example) one-half normal level (-6 dB), to each of the side channels.

BRIEF DESCRIPTION OF THE DRAWING

The invention will be described in more detail, by way of example, with reference to FIGS. 1 and 2 of the drawings representing schematically the recording and playback processes and circuits which are employed.

DESCRIPTION OF THE PREFERRED EMBODIMENT

Figure 1:
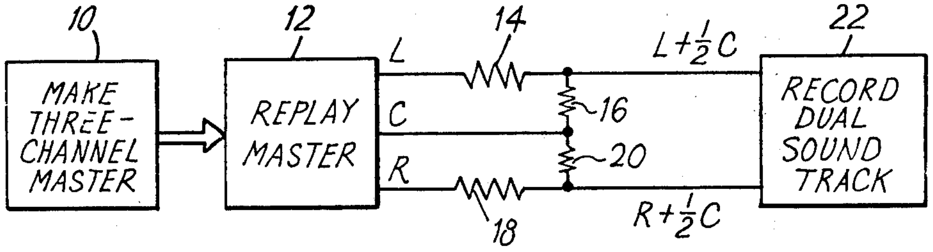

In FIG. 1, block 10 represents the conventional production of a three-channel master tape which is replayed (block 12) to provide signals denoted L (left), C (center) and R (right). Summing resistors 14 and 16 produce a signal $L + \frac{1}{2}C$ and summing resistors 18 and 20 produce a signal $R + \frac{1}{2}C$. Resistors 16 and 20 are larger than resistors 14 and 16. The signals $L + \frac{1}{2}C$ and $R + \frac{1}{2}C$ are transferred, block 22, to the two tracks of a dual-bilateral optical sound track which only differs from a conventional stero sound track in the addition of ½C to each of L and R.

Figure 2:
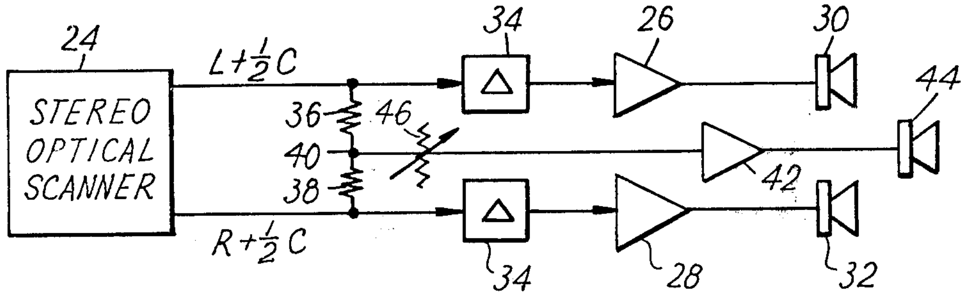

On playback of the sound track (FIG. 2) a conventional stereo optical scanner 24 reproduces the signals L + ½C and R + ½C. These two signals are applied to respective amplifer channels 26 and 28 feeding left and right loudspeakers 30 and 32. Each channel 26 and 28 includes a delay 34 of, say, 8 ms. The signals L + ½C and R + ½C are also applied to summing resistors 36 and 38, which produce a signal at point 40 equal to L + R + C. This signal is reproduced by a center channel amplifer 42 and loudspeaker 44 but at a reduced level, this being indicated by the schematic representation of a variable attenuator 46.

The left and right channel signals are passed through the independent delay circuits 34, including such circuitry as is necessary to maintain the desired signal quality, and then fed to the amplifiers 26 and 28 which drive the corresponding placed loudspeakers 30 and 32. The amount of delay used is chosen so as to ensure that almost all listeners in the theatre will hear the center information from the center loudspeaker, before they hear the same information from either of the side loudspeakers. In accordance with the well-known "precedence effect" the center information will then appear to such listeners to issue from the position of the center loudspeaker 44. The effect of a central source produced by this method is sufficiently strong to persist even when the level of the center signal is attenuated considerably by use of the variable attenuator 46. In some experiments, the attenuation has been as much as 9 dB, without excessive instability of center information for listeners in most parts of the auditorium. This is an important aspect of the network's operation, as the effectiveness of the stereophonic presentation, that is, the separation of apparent right and left channel information, is maintained if the center channel level can be kept sufficiently low. Under these conditions, the precedence effect can be made to break down for the stereophonic information, while it still operates for the center information, by an appropriate choice of attentuation and time delay.

What is claimed is:

1. A stereophonic sound reproducing system comprising two inputs for left and right channel signals, left and right amplifying channels and loudspeakers connected to the respective inputs, means for summing the signals from the two inputs, and a center amplifying channel and loudspeakers connected to receive the summed signals, wherein each of the left and right amplifying channels includes sufficient delay to establish a precedence effect for the center channel loudspeaker, and the level of sound provided by the center channel loudspeaker is sufficiently less than that provided by the left and right channel loudspeakers for the latter to establish a stereo image when the left and right channel signals differ.

2. A system according to claim 1, wherein the center amplifying channel includes means for adjusting the reduced level of sound provided by the center channel loudspeaker.

3. A system according to claim 1, further comprising a dual, stereo optical sound track scanning means arranged to provide the left and right channel signals to the said two inputs.

4. A method of effecting stereophonic sound reproduction wherein signals L, C and R representing left, center and right channel information, respectively, are mixed to produce a composite L and C signal and a composite R and C signal, the two composite signals are recorded, played back and combined to form a sum signal, the sum signal is reproduced as a center signal, and the played back composite signals are reproduced as left and right signals at a higher level than the sum signal but with a delay relative to the reproduction of the sum signal.

5. A method according to claim 4, wherein the delay is from 6 milliseconds to at least 12 milliseconds.

6. A method according to claim 4, wherein the reproduced signals are reproduced in a cinema auditorium and wherein the signal C is a dialogue signal.

* * * * *